(12) United States Patent
Caldwell et al.

(10) Patent No.: US 6,357,465 B1
(45) Date of Patent: Mar. 19, 2002

(54) SHIPPING CAP FOR EVACUATION VALVE

(75) Inventors: William P. Caldwell, South Lyon; James Brancheau, Livonia; Kenneth Messinger, Brownstown Twp., all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 2 days.

(21) Appl. No.: 09/606,913

(22) Filed: Jun. 29, 2000

(51) Int. Cl.$^7$ ............................................... B60T 11/00
(52) U.S. Cl. .......................... 137/71; 137/523; 188/352
(58) Field of Search ........................ 137/71, 523, 461; 188/352

(56) References Cited

U.S. PATENT DOCUMENTS

| | | | | |
|---|---|---|---|---|
| 2,046,228 A | * | 6/1936 | Wiedmann et al. ............ | 137/71 |
| 2,059,629 A | * | 11/1936 | Erwin et al. ................... | 137/71 |
| 4,164,241 A | * | 8/1979 | Kubo .......................... | 137/377 |
| 4,762,140 A | * | 8/1988 | Davis .......................... | 137/71 |
| 4,834,140 A | * | 5/1989 | Schmidt ................... | 137/614.17 |
| 5,103,853 A | * | 4/1992 | McGushion et al. ........... | 137/71 |
| 5,758,682 A | * | 6/1998 | Cain ....................... | 137/68.14 |
| 5,816,281 A | * | 10/1998 | Mixon .......................... | 137/14 |
| 6,000,632 A | * | 12/1999 | Wallace ....................... | 239/204 |
| 6,196,364 B1 | * | 3/2001 | Fouts .......................... | 188/352 |
| 6,269,921 B1 | * | 8/2001 | Agnew et al. .............. | 188/352 |

* cited by examiner

*Primary Examiner*—John Rivell
*Assistant Examiner*—Meredith M Schoenfeld
(74) *Attorney, Agent, or Firm*—MacMillan, Sobanski & Todd, LLC

(57) ABSTRACT

A cap for use in a hydraulic control unit. The cap retains a poppet in a fill position within a sleeve. The cap has at least one body. The body has a retaining surface, for insertion into the sleeve for limiting movement of the poppet within the sleeve. The body also has at least one grip for holding the cap within the sleeve.

17 Claims, 3 Drawing Sheets

SHIPPING CAP FOR EVACUATION VALVE

TECHNICAL FIELD

This invention relates to a method of preparing an evacuation valve for shipping after manufacturing. More specifically, this invention relates to an evacuation valve shipping cap and a method of placing the shipping cap into an evacuation valve for shipping and use in evacuation and fill of a brake system.

BACKGROUND OF THE INVENTION

This invention relates in general to vehicular brake systems. In particular, this invention relates to a vehicle stability control (VSC) system having an evacuation valve for evacuating air and filling with brake fluid an otherwise isolated circuit. This VSC system is adapted for used in an anti-lock brake system (ABS) and traction control (TC) brake system.

Vehicles are commonly slowed and stopped with hydraulic brake systems. While these systems vary in complexity, a typical base brake system includes a tandem master cylinder, a fluid conduit arranged in two similar but separate brake circuits, and wheel brakes in each circuit. The master cylinder generates hydraulic forces in both brake circuits by pressurizing brake fluid when the driver steps on the brake pedal. The pressurized fluid travels through the fluid conduit in both circuits to actuate brake cylinders at the wheels and slow the vehicle.

Braking a vehicle in a controlled manner under adverse conditions requires precise application of the brakes by the driver. Under these conditions, a driver can easily apply excessive brake pressure thus causing one or more wheels to lock, resulting in excessive slippage between the wheel and road surface. Such wheel lock-up conditions can lead to greater stopping distances and possible loss of directional control.

Advances in braking technology have led to the introduction of ABS systems. An ABS system monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising apply (isolation) valves and dump valves, are located between the master cylinder and the wheel brakes and perform the pressure regulation. Typically, when activated, these ABS valves operate in three pressure control modes: pressure apply, pressure dump and pressure hold. The apply valves allow brake pressure into the wheel brakes to increase pressure during the apply mode, and the dump valves release pressure from the wheel cylinders during the dump mode. Wheel cylinder pressure is held constant during the hold mode.

A further development in braking technology has led to the introduction of traction control (TC) systems. Additional valves have been added to existing ABS systems to provide a brake system that controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, braking pressures greater than the master cylinder pressure must quickly be available when the vehicle is accelerating.

During vehicle motion such as cornering, dynamic forces are generated which can reduce vehicle stability. A VSC brake system improves the stability of the vehicle by counteracting these forces through selective brake actuation. These forces and other vehicle parameters are detected by sensors that signal an electronic control unit. The electronic control unit automatically operates pressure control devices to regulate the amount of hydraulic pressure applied to specific individual wheel brakes. In order to achieve optimum vehicle stability, brake pressures greater than the master cylinder pressure may be required in a very short time. However, a brake system that generates high pressures very quickly typically has high power requirements or uses a large high pressure accumulator.

During installation of a brake system, an evacuation and fill process removes air trapped in the system and fills the system with hydraulic brake fluid. In order to reduce installation time, it is desirable to perform an evacuation and fill process without opening otherwise normally closed valves, particularly solenoid actuated valves which would require electrical connection. In a VSC system, it is desirable to also evacuate and fill isolated circuits without electrically connecting priming and charging valves.

SUMMARY OF THE INVENTION

The above objects as well as other objects not specifically enumerated are achieved by a cap for use in a hydraulic control unit. The cap retains a poppet in a fill position within a sleeve. The cap has at least one body. The body has a retaining surface, for insertion into the sleeve for limiting movement of the poppet within the sleeve. The body also has a grip for holding the cap within the sleeve.

According to this invention there is also provided a cap for use in a hydraulic control unit. The cap retains a poppet in a fill position within a sleeve. The cap has at least one body. The body has a retaining surface, for insertion into the sleeve for limiting movement of the poppet within the sleeve. The body also has at least one grip for holding the cap within the sleeve.

Various objects and advantages of this invention will become apparent to those skilled in the art from the following detailed description of the preferred embodiment, when read in light of the accompanying drawings.

DETAILED DESCRIPTION OF THE INVENTION

Figure 1:
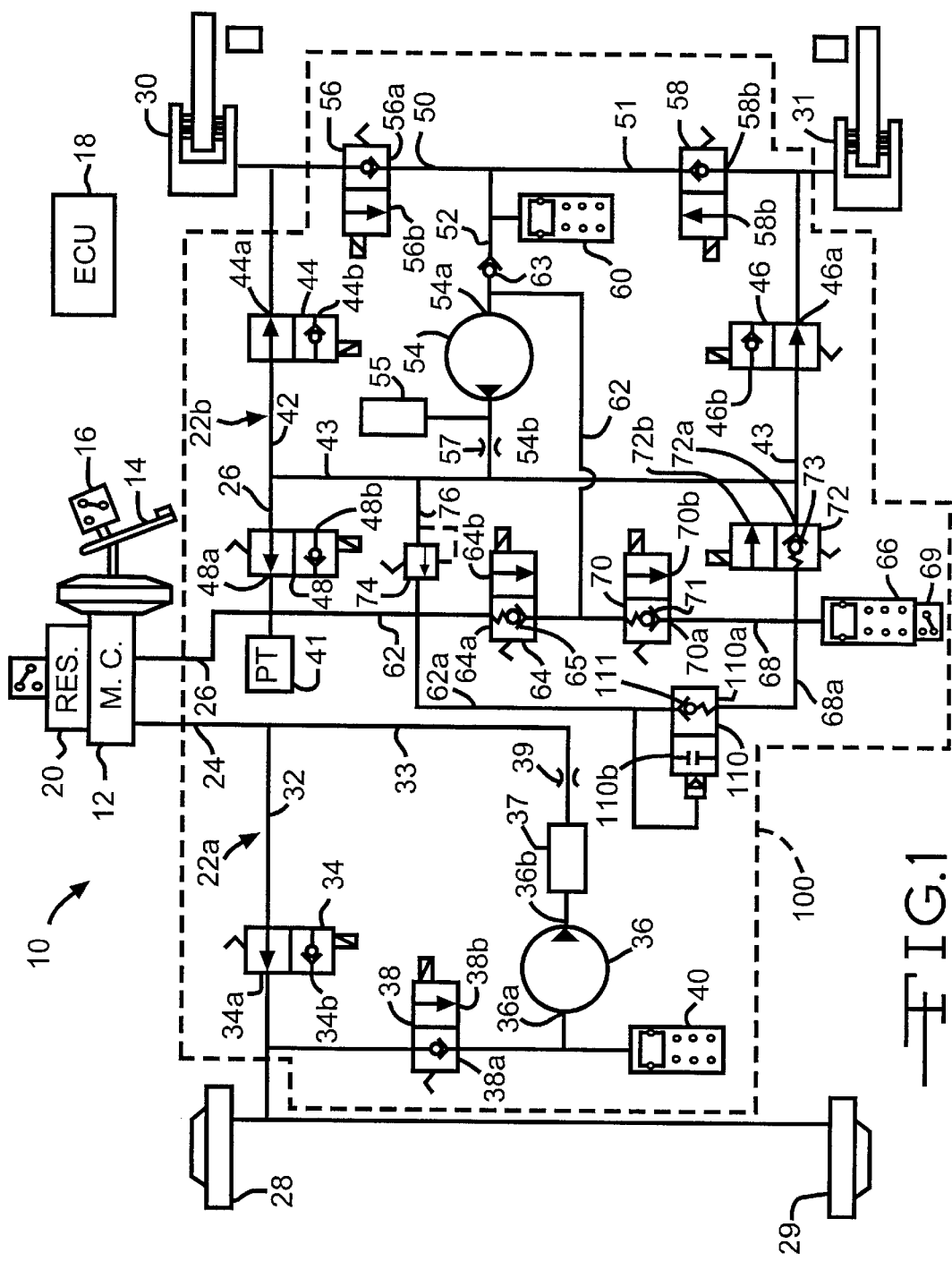
FIG. 1 is a schematic view of a hydraulic brake system.

FIG. 1 illustrates an ABS/TC/VSC brake system 10 according to this invention. The brake system 10 includes a tandem master cylinder 12 for pressurizing brake fluid when the driver steps on the brake pedal 14. A brake switch 16 is If connected to the Electronic Control Unit (ECU) 18 to indicate that the driver is stepping on the brake pedal 14. A reservoir 20 is connected to the master cylinder 12 and holds a supply of brake fluid at atmospheric pressure. Two separate brake circuits 22a, 22b are connected to the master cylinder 12 via main fluid conduits 24 and 26 respectively. The brake system 10 is preferably configured as a vertical split system with brake circuit 22a having first and second wheel brakes 28 and 29 connected to the master cylinder 12 via the main conduit 24 and brake circuit 22b having first and second wheels brakes 30 and 31 connected to the master cylinder 12 via main conduit 26. The brake system 10 provides ABS control to all four wheel brakes 28–31 and brake circuit 22b provides VSC and traction control to the wheel brakes 30 and 31.

In brake circuit 22a, the main conduit 24 splits into two conduits 32 and 33. A normally open solenoid actuated 2-position, 2-way ABS isolation valve 34 is located in conduit 32 between the master cylinder 12 and the wheel brakes 28 and 29. The solenoid actuated isolation valve 34 has a first, open position 34a and a second position 34b having a one-way valve which allows fluid to flow from the wheel brakes 28 and 29 towards the master cylinder 12 but prevents flow in the opposite direction. A pump 36 having an inlet 36a and an outlet 36b is located in conduit 33. A 2-position, 2-way solenoid actuated dump valve 38 is located in conduit 33 between the wheel brakes 28 and 29 and the pump inlet 36a. A damping chamber 37 and restricting orifice 39 are located at the pump outlet 36b to reduce the pressure pulsations from the pump. A low pressure accumulator (LPA) 40 is located in conduit 33 between the pump 36 and the dump valve 38. The dump valve 38 has a first, one-way position 38a which prevents fluid from flowing from the wheel brakes 28 and 29 to the LPA 40 but allows fluid to flow in the opposite direction, and a second, open position 38b allowing flow in both directions.

In circuit 22b, a master cylinder pressure transducer 41 is located in conduit 26 and is connected to the ECU 18 to indicate the master cylinder pressure. The main brake conduit 26 splits into two conduits 42 and 43. Conduit 42 is connected to the first wheel brake 30 and conduit 43 is connected to the second wheel brake 31. A first normally open solenoid actuated 2-position, 2-way ABS isolation valve 44 is located in conduit 42 between the first wheel brake 30 and the master cylinder 12. A second normally open solenoid actuated 2-position, 2-way ABS isolation valve 46 is located in conduit 43 between the second wheel brake 31 and the master cylinder 12. The ABS isolation valves 44, 46 have a first open position 44a, 46a and a second position 44b, 46b having a one-way valve which allows fluid to flow from the wheel brakes 30 and 31 towards the master cylinder 12 but prevents flow in the opposite direction. A normally open solenoid actuated 2-position, 2-way traction control isolation valve 48 is located in conduit 26 between the master cylinder 12 and the ABS isolation valves 44 and 46. The traction control isolation valve 48 has a first open position 48a, and a second position 48b having a one-way valve which allows fluid to flow from the master cylinder 12 towards the wheel brakes 30 and 31 but prevents flow in the opposite direction.

Conduits 50 and 51 connect the first and second wheel brakes 30 and 31 respectively to a conduit 52 that is connected to conduit 43. A pump 54 having an inlet 54a and an outlet 54b is located in conduit 52. A damping chamber 55 and restricting orifice 57 are located at the pump outlet 54b to reduce the pressure pulsations from the pump 54. A first 2-position, 2-way solenoid actuated dump valve 56 is located in conduit 50 between the wheel brake 30 and the connection with conduit 52. A second 2-position, 2-way solenoid actuated dump valve 58 is located in conduit 51 between the wheel brake 31 and the connection with conduit 52. A low pressure accumulator (LPA) 60 is located in conduit 52 between the pump 54 and the dump valves 56 and 58. The dump valves 56, 58 have a first, one-way position 56a, 58a which prevents fluid from flowing from the wheel brakes 30 and 31 to the LPA 60 but allows fluid to flow in the opposite direction, and a second, open position 56b, 58b allowing flow in both directions.

A supply conduit 62 is connected to the main brake conduit 26 between the traction control isolation valve 48 and the master cylinder 12. Fluid can flow from the master cylinder 12 through the main brake conduit 26 to reach the supply conduit 62 without traveling through a valve element. The supply conduit 62 is also connected to the pump inlet 54a for supplying the pump 54 with fluid. A 2-position, 2-way solenoid actuated supply valve 64 is located in the supply conduit 62 between the master cylinder 12 and the pump inlet 54a. The supply valve 64 has a first, one-way position 64a, in which a spring-loaded check valve 65 prevents fluid from flowing from the master cylinder 12 to the pump inlet 54a but allows fluid to flow in the opposite direction when the fluid reaches pressures of approximately 800 p.s.i. greater than the master cylinder pressure. The 800 p.s.i. pressure requirement may be different depending on system parameters. The supply valve 64 also has a second, open position 64b allowing flow in both directions. A one-way check valve 63 is located between the connection of the supply conduit 62 to conduit 52 and the LPA 60. The check valve 63 prevents fluid in the supply conduit 62 from flowing into the LPA 60, but allows fluid in the LPA 60 to flow towards the pump inlet 54a.

A medium pressure accumulator (MPA) 66 is located in conduit 68 that connects conduit 62 to conduit 43. The MPA 66 stores fluid at pressures which are higher than a typical low pressure accumulator but which are lower than a typical high pressure accumulator. The MPA 66 preferably stores fluid between 40 p.s.i. and 400 p.s.i., however fluid may be stored at other suitable pressures. A switch 69 on the MPA 66 is connected to the ECU 18 to indicate whether or not the MPA is full of pressurized fluid.

A first control valve in the form of a 2-position, 2-way solenoid actuated priming valve 70 is located in conduit 68 between its connection to the supply conduit 62 and the MPA 66. The priming valve 70 has a first, one-way position 70a, in which a spring-loaded check valve 71 prevents fluid from flowing from the master cylinder 12 to the MPA 66 but allows fluid to flow in the opposite direction when the fluid as reaches a pressure differential of approximately 1600 p.s.i. across the valve 71. The priming valve 70 also has a second, open position 70b allowing flow in both directions.

A second control valve in the form of a 2-position, 2-way solenoid actuated charging valve 72 is located in conduit 68 between the connection with conduit 43 and the MPA 66. The charging valve 72 has a first, one-way position 72a, in which a spring-loaded check valve 73 prevents fluid from flowing from the MPA 66 towards the wheel brakes 30 and 31 but allows fluid to flow in the opposite direction when the fluid reaches a pressure differential of approximately 1600 p.s.i. across the valve. The 1600 p.s.i. pressure requirements needed to open the spring loaded check valves 71 and 73 may be different values depending on system parameters. The charging valve 72 also has a second, open position 72b allowing flow in both directions. A switchable solenoid valve is used rather than a check valve because by opening the charging valve 72 the MPA 66 can be charged by the pump 54 without creating a large load on the pump 54. Also, a solenoid valve is more contamination resistant in the fully open position than a spring loaded check valve used as a relief valve.

A bypass valve 74 is connected to conduits 43 and 62 and is connected in parallel to the traction control isolation valve 48. The bypass valve 74 prevents excessive pressure buildup by opening at approximately 2500 p.s.i. to allow pressurized fluid to flow back to the master cylinder 12 when the traction control isolation valve 48 is in the second position 48b. The opening pressure of the bypass valve 74 should be higher than the sum of the opening pressure of the spring loaded check valve 73 in the charging valve 72 plus the MPA pressure to keep fluid taken from the MPA 66 during VSC mode in the braking system (where it will be returned to the MPA) rather than being returned to the master cylinder 12.

During normal braking the driver actuates the base braking system by pushing on the brake pedal 14 which causes the master cylinder 12 to pressurize brake fluid. In circuit 22a, the pressurized brake fluid travels through conduits 24 and 32, through the open ABS isolation valve 34 and into the wheel brakes 28 and 29 to brake the vehicle. In circuit 22b, the pressurized brake fluid travels through conduits 26, 42 and 43, through the open ABS isolation valves 44 and 46 and into the wheel brakes 30 and 31 to brake the vehicle. When the driver releases the brake pedal, the master cylinder 12 no longer pressurizes the brake fluid and the brake fluid returns to the master cylinder 12 via the same route.

During ABS modes, the driver applies the brakes in a similar manner as during normal braking. When a wheel begins to slip, the pumps 36 and 54 run and pressurize fluid in circuits 22a and 22b. The ABS isolation valves 34, 44 and 46 and the ABS dump valves 38, 56 and 58 are pulsed to control the pressures at the wheel brakes 28, 29, 30, and 31.

The MPA 66 is filled, or charged, with pressurized fluid during a charging mode. The charging mode is initiated when the MPA switch 69 indicates that the MPA 66 is not full and the brake switch 16 and master cylinder pressure transducer 41 indicate that the driver is not requesting base braking by pushing on the brake pedal 14. The traction control isolation valve 48, and the first and second ABS isolation valves 44 and 46, are shuttled to their second positions 48b, 44b, and 46b to prevent pressurized fluid from reaching the master cylinder 12 and wheel brakes 30 and 31. The charging valve 72 is shuttled to the second position 72b to open a path between the pump outlet 54b and the MPA 66. The supply valve 64 is shuttled to the second position 64b to allow fluid from the master cylinder 12 to supply the pump inlet 54a. The pump 54 runs and pumps pressurized fluid into the MPA 66 until the MPA switch 69 indicates that the MPA 66 is full. When the MPA 66 is full, the pump 54 is turned off and the traction control isolation valve 48, ABS isolation valves 44 and 46, supply valve 64 and charging valve 72 are returned to the first positions 48a, 44a, 46a, 64a and 72a. The pressure of the fluid stored in the MPA 66 when it is full is approximately 400 p.s.i., although any suitable pressure can be used.

The spring loaded check valve 71 in the priming valve 70 provides a pressure relief function which prevents fluid expansion in a fully charged MPA 66 from generating pressures capable of damaging components. For example, if the temperature of the fluid in the fully charged MPA 66 should increase, the pressure in the MPA 66 will increase. The increased pressure will open the check valve 71 and the excess fluid will flow back to the master cylinder 12 through the check valves (not shown) located in the pump 54.

The brake system 10 provides VSC to the wheel brakes 30, 31 using circuit 22b to generate the necessary fluid pressures. VSC may be needed when the driver is applying the brakes or when the driver is not applying the brakes. Pressurized fluid stored in the MPA 66 is used to provide fluid flow rates which are greater than those available from a standard ABS/TC pump 54 to begin to fill the wheel brakes 30, 31. When VSC is needed, the priming valve 70 is switched to the open position 70b to allow pressurized fluid to flow from the MPA 66 to the pump inlet 54a. Thus, the pump 54 provides fluid at a higher pressure than otherwise possible to the wheel brakes 30, 31. VSC braking pressures are achieved by pulsing the isolation valves 44, 46 and dump valves 56, 58 to regulate pressures at the wheel brakes 30, 31. When the MPA 66 has discharged to a pressure below a predetermined pressure, the priming valve 70 is switched back to the one-way position 70a.

The valves and pumps are preferably mounted together in a hydraulic control unit (HCU) 100. The hydraulic control unit 100 may be mounted in a remote location using longer conduits to connect it with the master cylinder 12. The longer conduits typically impart flow restrictions which lengthen the time required to charge the MPA 66, however, the time required to charge the MPA 66 is not critical.

During TC or when VSC is needed while the driver is not pushing the brake pedal 14, the traction control isolation valve 48 is shuttled to the second position 48b to prevent the pressurized fluid from reaching the master cylinder 12. The first and second ABS isolation valves 44 and 46 are also shuttled to the second positions 44b and 46b to prevent pressurized fluid from reaching the wheel brakes 30 and 31. The pump 54 is energized and pressurizes fluid. The ECU 18 selects the wheel to be braked and pressurized fluid is supplied to it by shuttling the priming valve 70 to the second, open position 70b and pulsing the corresponding ABS isolation valve 44 or 46 to the second, open position 44b or 46b. The pressurized fluid in the MPA 66 flows into the selected wheel brake 30 or 31 providing a rapid pressure increase. The spring loaded check valve 65 in the supply valve 64 holds pressure on the pump inlet 54a side of the supply valve 64 so that the fluid released from the MPA 66 by the priming valve 70 will not flow back to the master cylinder 12.

The pressure at the selected wheel brake 30 or 31 is increased in a controlled manner by pulsing the corresponding ABS isolation valve 44 or 46 open and closed. The pressure is decreased in a controlled manner by pulsing open the corresponding ABS dump valve 56 or 58, allowing some of the pressurized fluid in the wheel brake 30 or 31 to flow into the LPA 60. While the ABS isolation valve 44 or 46 is pulsed closed, the pressurized fluid in the LPA 60 is pumped through the spring loaded check valve 73 in the charging valve 72 to charge the MPA 66. Therefore, the amount of fluid stored in the LPA 60 is minimized to provide adequate storage requirements in case of transition to ABS. In addition, the amount of fluid stored in the MPA 66 is maximized to reduce the need to enter the MPA charging mode.

If the driver should apply the brakes during the TC or VSC mode just described (VSC without brake apply), some pedal movement will be experienced as the master cylinder 12 pressurizes the brake fluid in circuit 22a. However, the driver is isolated from the front wheel brakes 30 and 31 and some action must be taken in circuit 22b or the driver will experience an unusually high, hard brake pedal 14. When the pressure transducer 41 and the brake switch 16 indicate that the driver is applying the brakes during TC or VSC mode, the priming valve 70 remains in the first position 70a and the supply valve 64 is shuttled to the second position 64b. The pressurized fluid from the master cylinder 12 is supplied to the pump inlet 54a and the driver will experience brake pedal movement that is typical to normal base braking. When the MPA switch 69 indicates to the ECU 18 that the MPA 66 is full, the supply valve 64 is returned to the first position 64a.

When VSC mode is entered while the driver is already applying the brakes, the valve control is the same as in VSC without brake pedal apply except that the supply valve 64 is pulsed to the second, open position 64b instead of the priming valve 70. The driver will experience brake pedal movement typical of normal base braking and the pump inlet 54a is supplied with fluid. Further VSC control is similar to the VSC control without brake pedal apply described above. When the driver releases the brake pedal 14, the excess fluid in circuit 22b which was supplied by the master cylinder 12 is pumped back to the master cylinder 12 through the bypass valve 74. Since the master cylinder pressure may be at a relatively high pressure, the bypass valve 74 references atmospheric pressure and opens when the pressure at the pump outlet 54b reaches approximately 2500 p.s.i. above atmospheric pressure.

During a transition from ABS control to VSC control the traction control isolation valve 48 is shuttled to the second position 48b to allow pressures greater than master cylinder pressure to be achieved at the wheel brakes 30 and 31. Fluid may still be stored in the LPA 60 from the previous ABS mode, and this fluid is pumped through the bypass valves 74 and back to the master cylinder 12. Through proper control of the valves and utilizing information from the MPA switch 69, a consistent relationship of pedal travel to brake pressure can be maintained in all modes of operation.

During installation on a vehicle, the system 10 preferably undergoes an evacuation and fill process to eliminate air in the various conduits and fill them with hydraulic brake fluid. Conventional techniques for evacuation and fill are suitable for a portion of system 10. However, conduit 68 between the priming valve 70 and the charging valve 72 is not evacuated and filled due to the first positions of the priming valve 70 and charging valve 72. In their respective first positions, the spring loaded check valves 71 and 73 prevent conventional techniques from evacuating air from and filling conduit 68 with brake fluid. The first positions are the unenergized positions of the valves 70 and 72.

An evacuation valve (or piloted shuttle valve) 110 is provided in system 10 to evacuate and fill conduit 68. The evacuation valve 110 is a 2-position, 2-way pressure actuated valve including a first, one-way position 110a in which a spring-loaded check valve 111 prevents fluid from flowing from conduit extension 68a to conduit extension 62a but allows fluid flow in the opposite direction when a predetermined fluid pressure is reached. The evacuation valve 110 also has a second, closed position 110b that prevents fluid flow through the valve 110.

Figure 2:
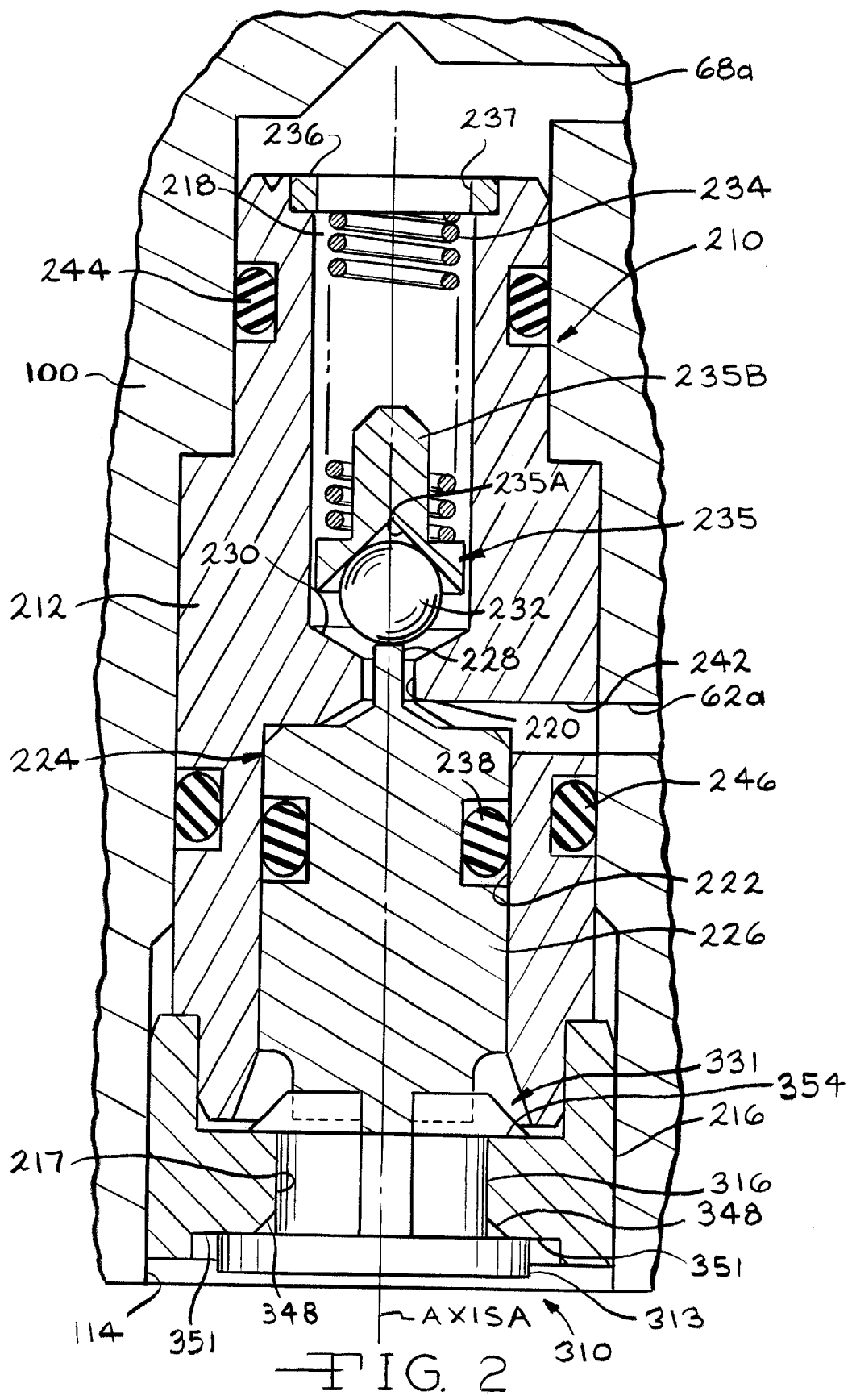
FIG. 2 is a cross-sectional elevational view of a shipping cap according to the invention in an evacuation valve.

An evacuation valve is indicated generally at 210 in FIG. 2. The evacuation valve 210 can be substituted for the evacuation valve 110 of the system 10 and function in a similar manner. The evacuation valve 210 includes a generally cylindrical sleeve 212 extending along longitudinal axis "A." The evacuation valve 210 has a stepped outer diameter received in a stepped bore 114 provided in the HCU 100. The sleeve 212 is retained in the bore 114 by an end cap 216. The end cap 216 can be retained in the bore 114 by any desired means including metal forming. A central opening 217 is provided in the end cap 216. The end cap 216 defines an annular chamfer 348 and a shipping cap seat 351. The annular chamfer 348 forms a preferably acute angle with longitudinal axis "A."

The sleeve 212 is formed with a first axial chamber 218 connected by a reduced-diameter channel 220 to a second axial chamber 222. A piston or poppet 224 includes a main body 226 slidably received in the second axial chamber 222. A stem 228 is preferably integrally formed at the end of the poppet 224 that extends through the channel 220 into the first axial chamber 218. A inner end of the first axial chamber 218 is formed with a valve seat 230. A check ball 232 is biased by a spring 234 against the valve seat 230 when the poppet 224 is not in the depressed position. A ball retainer 235 having a seat 235A and a stem 235B is positioned between the spring 234 and the check ball 232. A retainer 236 is secured to an inner end of the sleeve 212 by any desired means and provides a stop for the spring 234. A port 237 is provided in retainer 236 so that fluid in the first axial chamber 218 is in fluid communication with fluid from conduit 68 via extension conduit 68a.

A series of fluid seals are provide. A seal 238, preferably formed as an O-ring, is received in a groove formed in an outer surface of the poppet 224 to provide a fluid seal between extension conduit 62a and the HCU 100. A seal 244 is received in a groove formed in an outer surface of the sleeve 212 to provide a fluid seal between extension conduit 68a and extension conduit 62a. A seal 246 is received in a groove formed in an outer surface of the sleeve 212 to provide a fluid seal between extension conduit 62a and the HCU 100.

A port 242 is formed in the sleeve 212 in fluid communication with the second axial chamber 222. An extension conduit 62a of the supply conduit 62 is formed in the HCU 100 and terminates at the bore 214 in fluid communication with port 242.

Figure 3:
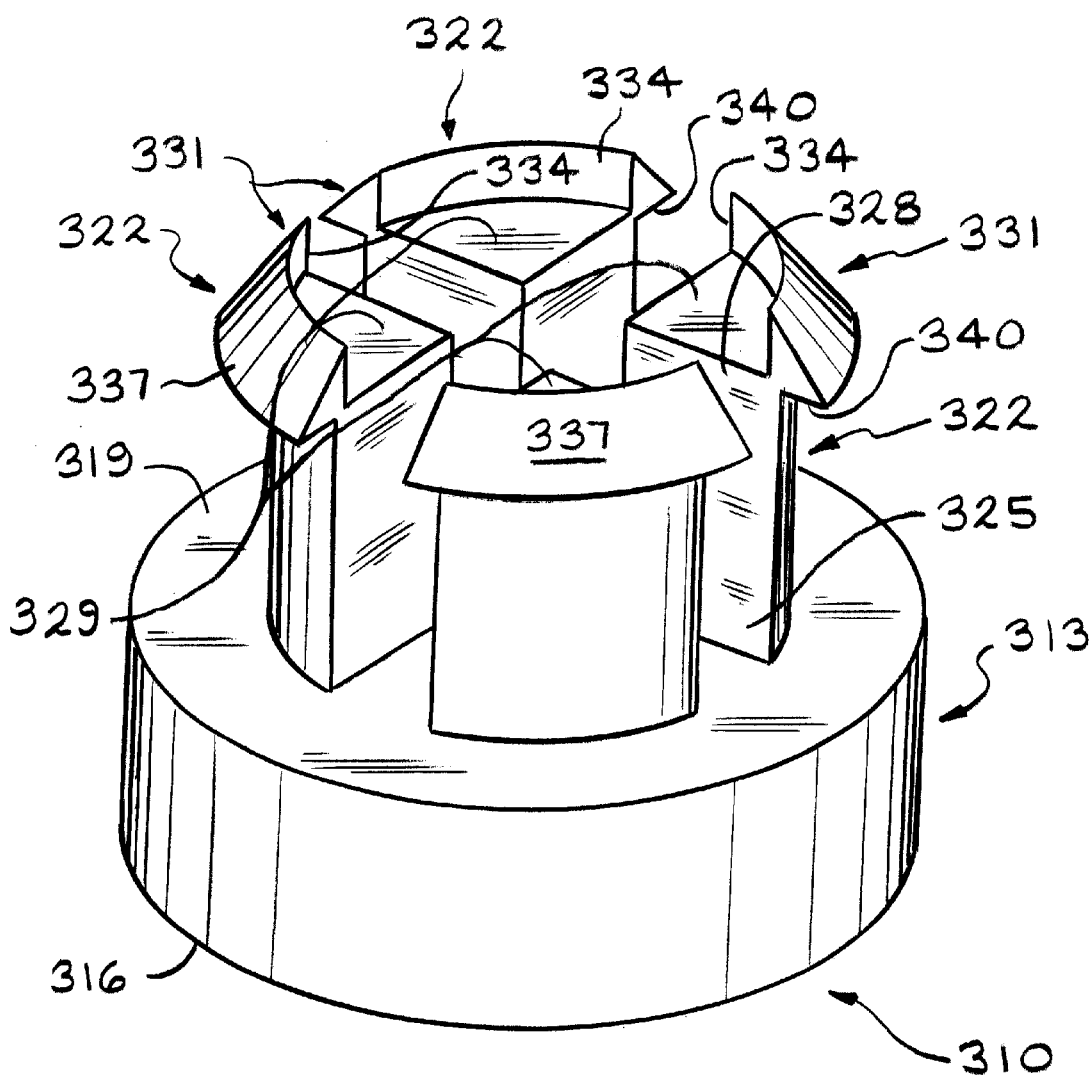
FIG. 3 is a perspective elevational view of the shipping cap of FIG. 2.

A shipping cap is indicated generally at 310 in FIGS. 2 and 3. The shipping cap 310 preferably includes a base portion 313. The base portion 313 is preferably cylindrical and has a first face 316 and a second face 319. The first face 316 and the second face 319 extend in a transverse plane perpendicular to longitudinal axis "A." The base portion 313 supports one or more longitudinally extending fingers 322, preferably four. For purposes of this invention, each finger 322 is considered a body. It should be understood that bodies other than fingers could be employed. For example, the body could be a cylindrical member having a continuous rib about the periphery. In addition, the body could be a spring having a grip around the periphery.

In a preferred embodiment, the fingers 322 have a trilateral cross-sectional shape but may have any other suitable cross-sectional shape. Each finger 322 has a first end 325 and a second end 328. The second end 328 forms a retaining surface 329 for contacting or receiving the poppet 224 and limiting movement of the poppet 224 within the sleeve 212. Preferably, the fingers 322 have sufficient resilience, or flexibility, that the second end 328 is able to flex radially. The first end 325 of the finger 322 is mounted on and extends from the second face 319 of the base portion 313. When the shipping cap 310 includes a plurality of fingers 322, the fingers 322 are preferably circumferentially spaced apart.

The second end 328 of the finger 322 forms radially outward extending ribs 331. The ribs 331 preferably have a wedge shaped cross-sectional shape, but can have any suitable cross-sectional shape. In a preferred embodiment, each finger 322 forms one rib 331, but the fingers 322 can have any suitable number of ribs 331. When the shipping cap 310 includes a plurality of ribs 331, the ribs 331 are preferably circumferentially spaced apart. In a preferred embodiment, the rib 331 has a trilateral cross-sectional shape. The ribs 331 preferably have generally longitudinally extending inner surfaces 334. The inner surfaces 334 are preferably curved to accommodate or receive the poppet 224, but may be non-curved. Radially outward of the inner surface 334 are the outer surfaces 337 of the ribs 331. The outer surfaces 337 are preferably curved and convex, but may have any suitable contour. The outer surfaces 337 preferably form an acute angle with the inner surfaces 334. The acute angle is preferably approximately equal to the angle of the annular chamfer 348 with the longitudinal axis "A." In a preferred embodiment, the radial width of the lower or transverse surfaces 340 of the ribs 331 radially spaces apart the outer surfaces 337 of the ribs 331 from the radially outer surface of the fingers 322.

The ribs 331 of the fingers 322 grip a portion of the end cap 216, preferably a bearing surface 354 (shown in FIG. 2) of the end cap 216. It should be understood that grips other than ribs 331 could be employed, such as adhesive grips (not shown) or friction grips (not shown). In a preferred embodiment, the lower surfaces 340 of the ribs 331 grip or press down on the bearing surface 354 of the end cap 216.

Prior to the evacuation and fill process, the shipping cap 310 is inserted into the central opening 217 of the end cap 216 generally along longitudinal axis "A" (as shown in FIG. 2). For purposes of this invention, inserting any portion of the of shipping cap 310 into any portion of the end cap 216 will also be considered inserting the shipping cap 310 into the cylindrical sleeve 212. The shipping cap 310 is preferably inserted into the evacuation valve 210 by hand, but may be inserted by any suitable means. The shipping cap 310 is preferably not inserted into the evacuation valve 210 until after the quality testing of the evacuation valve 210 has been completed. During insertion, one or more outer surfaces 337 engage the annular chamfer 348. As insertion of the shipping cap 310 continues, the outer surfaces 337 engage the rest of the radially outward central opening 217. When the shipping cap 310 is fully inserted, a significant portion of the rib 331 is radially outward of the central opening 217. Likewise when the shipping cap 310 is fully inserted, the second face 319 of the base portion 313 preferably abuts the shipping cap seat 351 in the end cap 216.

The purpose of the inserted shipping cap 310 is to prevent the poppet 224 from moving downwardly (as viewed in FIG. 2) into the central opening 217 of the end cap 216 during the evacuation and filling process. The evacuation and filling process generates a relatively low, first pressure of brake fluid within the evacuation valve 210. The first pressure is typically less than about 150 p.s.i. The ribs 311 of the shipping cap 310 do not shear, but instead resist the first pressure. At the first pressure, the lower surfaces 340 of the ribs 311 abut against the bearing surfaces 354 of the end cap 216 to prevent downward movement of the shipping cap 310. The shipping cap 310 also prevents the stem 228 from being retracted from the first axial chamber 218, and the spring 234 from urging the check ball 232 onto the valve seat 230. Thus, the fully inserted shipping cap 310 allows both brake fluid flow and air flow from the conduit 68 to the supply conduit 62, both necessary to evacuate air from the MPA 66 and fill the MPA 66 with brake fluid.

When the shipping cap 310 is inserted into the cylindrical sleeve 212, the poppet 224 is in the depressed (or fill) position. In the fill position, the poppet is preferably contacts the retaining surface 329. Likewise, the stem 228 lifts the check ball 232 away from the valve seat 230 against the force of the spring 234 (as shown in FIG. 2). Air trapped in conduit 68 can be evacuated through the extension conduit 68a, port 237, the first axial chamber 218, channel 220, the second axial chamber 222, port 242, and extension conduit 62a as the supply conduit 62 is evacuated by conventional techniques. Once air is removed from the MPA 66 and evacuation valve 210, hydraulic fluid can be filled into conduit 68 as it travels from the supply conduit 62, through extension conduit 62a, port 242, the second axial chamber 222, channel 220, the first axial chamber 218, port 237, and extension conduit 68a. In the depressed (or fill) position, the poppet 224 allows air or fluid to flow in opposite directions within the sleeve.

Upon completion of the air evacuation and brake fluid fill process, a second and relatively high fluid pressure, typically greater than about 500 p.s.i., in supply conduit 62 and conduit extension 62a urges the poppet 224 downwardly (as viewed in FIG. 2). The second fluid pressure needed to displace the the poppet 224 is available during master cylinder displacement testing, which is a conventional process during installation of a vehicular braking system.

The ribs 311 of the shipping cap 310 are incapable of resisting the second pressure. Downward displacement of the poppet 224 shears a portion of the ribs 331 from the shipping cap 310. Shearing of the ribs 331 may be caused by the poppet 224 forcefully contacting the ribs 331, the retaining surface 329 of the fingers 322, or both. Shearing of the ribs 331 causes the shipping cap 310 to be displaced from the central opening 217. The shipping cap 310 is thus removed from the central opening 217 without a separate, manual intervention by an operator. After shearing, a portion of the ribs 331 may be retained between the end cap 216 and the sleeve 212.

Downward (as viewed in FIG. 2) displacement of the poppet 224, causes the stem 228 to be retracted from the first axial chamber 218. As the stem 228 is withdrawn, the spring 234 urges the check ball 232 onto the valve seat 230 thereby preventing fluid flow from conduit 68 to the supply conduit 62.

The evacuation valve 210 permits evacuation and fill of the otherwise isolated conduit 68 without increasing the complexity of procedures during installation of system 10. Additionally, evacuation valve 210 can be used during service of system 10. The poppet 224 can be depressed by a service technician or the like so that the system 10 can be evacuated in a conventional manner. The open evacuation valve 210 insures proper evacuation of the otherwise isolated conduit 68.

The shipping cap 310 is preferably made of plastic, though any suitable material can be used. Fiberfill J60-20 plastic provides satisfactory shearing of the ribs 331, as discussed above. The material used to manufacture the gripping portions of the shipping cap 310, such as ribs 331, should resist shearing by the poppet or similar structure at pressures up to about 150 p.s.i. The material should not resist shearing at pressures greater than about 500 p.s.i.

The principle and mode of operation of this invention have been described in its preferred embodiments. However, it should be noted that this invention may be practiced otherwise than as specifically illustrated and described without departing from its scope.

What is claimed is:

1. A cap for use in a hydraulic control unit for retaining a poppet in a fill position within a sleeve comprising:
   at least one body, the body having;
   a. a retaining surface, for insertion into the sleeve for limiting movement of the poppet within the sleeve; and
   b. a grip for holding the cap within the sleeve.

2. The cap of claim 1 further comprising a base portion which supports the retaining surface.

3. The cap of claim 1 wherein the grip includes a rib.

4. The cap of claim 3 wherein the rib has a strength sufficient to withstand without failure a pressure of at least about 150 pounds per square inch applied by the poppet.

5. The cap of claim 4 wherein the rib is incapable of resisting a pressure of about 500 pounds per square inch applied by the poppet.

6. The cap of claim 3 wherein the rib is incapable of resisting a pressure of about 500 pounds per square inch applied by the poppet.

7. The cap of claim 1 wherein the poppet includes a stem which supports a check ball, the check ball being separated from a valve seat when the poppet is in the fill position.

8. The cap of claim 1 wherein the body is able to flex radially within the sleeve.

9. A cap for use in a hydraulic control unit for retaining a poppet in a fill position within a sleeve comprising:
  at least one body, the body having;
    a. a retaining surface, for insertion into the sleeve for limiting movement of the poppet within the sleeve; and
    b. at least one grip for holding the cap within the sleeve.

10. The cap of claim 9 further comprising a base portion which supports the retaining surface.

11. The cap of claim 9 wherein the grips include a plurality of ribs.

12. The cap of claim 11 wherein the ribs have a strength sufficient to withstand without failure a pressure of at least about 150 pounds per square inch applied by the poppet.

13. The cap of claim 12 wherein the ribs are incapable of resisting a pressure of about 500 pounds per square inch applied by the poppet.

14. The cap of claim 12 wherein the ribs are incapable of resisting a pressure of about 500 pounds per square inch applied by the poppet.

15. The cap of claim 9 wherein the body includes a plurality of bodies spaced apart from each other circumferentially.

16. The cap of claim 9 wherein the poppet includes a stem which supports a check ball, the check ball being separated from a valve seat when the poppet is in the fill position.

17. The cap of claim 9 wherein the body is able to flex radially within the sleeve.

* * * * *